(12) United States Patent
Siri

(10) Patent No.: US 7,773,395 B2
(45) Date of Patent: Aug. 10, 2010

(54) UNIFORM CONVERTER INPUT VOLTAGE DISTRIBUTION POWER SYSTEM

(75) Inventor: Kasemsan Siri, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 390 days.

(21) Appl. No.: 11/713,826

(22) Filed: Feb. 21, 2007

(65) Prior Publication Data

US 2008/0197825 A1 Aug. 21, 2008

(51) Int. Cl.
*H02M 3/335* (2006.01)
(52) U.S. Cl. .............................. 363/65; 323/271; 307/77
(58) Field of Classification Search .................... 363/65, 363/67, 69, 70, 71; 307/77, 54, 58, 61, 63, 307/78, 43, 52, 53, 55, 60, 71, 62; 323/271, 323/225, 267, 268, 272, 299, 300, 902
See application file for complete search history.

(56) References Cited

U.S. PATENT DOCUMENTS

| | | | | |
|---|---|---|---|---|
| 5,184,290 A | * | 2/1993 | Ozawa et al. | 363/21.07 |
| 5,694,309 A | * | 12/1997 | Prager et al. | 363/65 |
| 2004/0233685 A1 | * | 11/2004 | Matsuo et al. | 363/65 |

* cited by examiner

*Primary Examiner*—Harry Behm

(57) ABSTRACT

A uniform converter input voltage distribution power system evenly controls the individual input voltages of DC-to-DC series-input parallel-output connected converters using a uniform input voltage distribution controller including a generator for generating respective error signals from the converter input voltages using a common distribution reference signal for providing respective converter control signals connected to the converters through respective shared-bus controls for evenly distributing the power delivered by the converters that are shared-bus current-mode converters for preferably providing a low output voltage. Employing a common regulation control signal, the controller can also provide system output voltage regulation, system input current limiting, proportional-voltage control, relaxed voltage uniformity, and fault-tolerant power control.

17 Claims, 4 Drawing Sheets

UNIFORM CONVERTER INPUT VOLTAGE
DISTRIBUTION POWER SYSTEM

UNIFORM CONVERTER INPUT VOLTAGE
DISTRIBUTION POWER SYSTEM

ADJUSTABLE UNIFORM INPUT
VOLTAGE DISTRIBUTION CONTROLLER

UNIFORM CONVERTER INPUT VOLTAGE DISTRIBUTION POWER SYSTEM

STATEMENT OF GOVERNMENT INTEREST

The invention was made with Government support under contract No. FA8802-04-C-0001 by the Department of the Air Force. The Government has certain rights in the invention.

REFERENCE TO RELATED APPLICATION

The present application is related to applicant's copending application entitled Uniform Converter Output Voltage Distribution Power System Ser. No. 11/145,336, filed Jun. 3, 2005, by the same inventor.

FIELD OF THE INVENTION

The invention relates to the field of field of power systems. More particularly, the invention relates to uniform voltage distribution of series-input parallel-output connected converters in DC-DC power systems.

BACKGROUND OF THE INVENTION

DC-DC Power systems have been using a plurality of converters connected in series-input and parallel-output configurations. Uniform output current-sharing and nonuniformly input voltage distribution exists as a result of mismatches in component values employed among nearly-identical series-input converters having outputs connected in parallel. With such mismatches, output voltage regulation performance becomes unreliable in both the steady state and the transient state because the input voltages across individual converters drift too far from a uniformly distributed voltage. Undesirable interactions among interconnected converters arise because of drifted nonuniform input voltage distribution that leads to instability due to different modes of operation among series-input converters, each of which is controlled differently under respective dedicated voltage regulation control.

DC-DC Power systems employing converters connected in parallel-input and parallel-output configurations are well known. The problem of uniform current distribution control is solved by using the manufacturer-provided parallel control port that serves as a common shared-bus, at which a single input voltage commands the parallel-connected converters to operate as voltage-controlled current-sources. This current-mode shared-bus approach to uniform current distribution is well established, particularly for parallel-connected conventional converters.

DC-DC converters can be connected in a distributed-input parallel-output configuration where the converter outputs are parallel connected to a common load and the inputs are individually connected to the distributed input power sources. The distributed sources may have non-identical characteristics that result in non-uniform distribution of the converter input voltages in addition to minor internal component mismatches among these converters. When each of the distributed input power sources is independent and not coupled to the other input power sources, the nonuniform input voltages may not become an issue because the system can achieve robust stability without dedicated uniform input voltage distribution control. However, when converters are connected in a series-input parallel-output topology that shares a common input power source across the series-connected converter inputs, the non-uniformly distributed input voltages can also lose stability and cause one or more of the converters to absorb an excessive portion of the common system input voltage. System reliability suffers because the converters that contribute a greater portion of the output power are thermally overstressed. These and other disadvantages are solved or reduced using the invention.

SUMMARY OF THE INVENTION

An object of the invention is to provide a series-input parallel-output power system having uniform power distribution among a plurality of DC-DC converters.

Another object of the invention is to provide a series-input parallel-output power system having uniform power distribution among a plurality of DC-DC converters having electrically isolated control ports isolated from the output voltage for isolation of the non-isolated control signals reference to input ground.

Yet another object of the invention is to provide a series-input parallel-output power system having uniform power distribution among a plurality of DC-DC converters with input-output isolation for controlling the converters using differential voltages being voltage differences each of which between two consecutive floating converter inputs.

Still another object of the invention is to provide a series-input parallel-output power system having uniform power distribution among a plurality of DC-DC converters with input-output isolation for controlling the converters using differential voltages being extracted from the successive floating voltages extending between a system input voltage and a system input ground.

A further object of the invention is to provide a series-input parallel-output power system having unequal power distribution among a plurality of DC-DC converters with input-output isolation for controlling the converters using a distribution voltage and differential voltages being extracted from the successive floating voltages that extend between a system input voltage and a system input ground.

Yet a further object of the invention is to provide a series-input parallel-output power system that is fault tolerant with uniform power distribution among a plurality of DC-DC converters with input-output isolation for controlling the converters.

The invention is directed to a uniform voltage distribution series-input parallel-output power system that includes DC-DC converters each of which having an electrical isolation between its respective non-isolated control signal and the floating shared-bus control port of the respective converter for a proper generation of its isolated control signal that regulates each respective converter that is typically controlled by its control voltage across the floating control port possessing its signal-reference node being the converter input-power return-terminal having a floating voltage. The input floating-voltages are arranged in order from the high input voltage to the low input power ground. Each pair of two consecutive floating inputs provides a differential input voltage that is used to provide input power to each respective converter. A commanding distribution voltage and the differential voltages are used for producing error voltages for generating the distributed control voltages for controlling the converters to have a proper distribution of the input voltages. The system is characterized as having an input-series of floating voltages for generating a common system output voltage using a plurality of DC-DC converters where the floating voltages are used to generate the distributed control signals for controlling, through an isolation means, the converters. In so doing, the converters have a predetermined power distribution that can be equal or unequal. The system can be designed to provide relaxed and fault tolerant operation.

The power system is expandable to as many converters as desired for higher system input voltage or higher output load current, provided that none of the maximum voltage ratings of the isolation devices, such as optocouplers or converter input-output isolation transformers, is exceeded. The controlling voltage at the shared-bus input of each converter is usually referenced to the converter power-input return terminal that possesses variable floating voltage. The serial-input parallel output converters preferably require isolated control. The system can further provide voltage regulation, current limiting, over voltage protection, and under voltage protection. The power system must have a proper distribution of the isolated feedback control voltages that stabilizes undesirable interactions among interconnected converters so as to eliminate component mismatch problems. These and other advantages will become more apparent from the following detailed description of the preferred embodiment.

DETAILED DESCRIPTION OF THE PREFERRED EMBODIMENT

Figure 1:
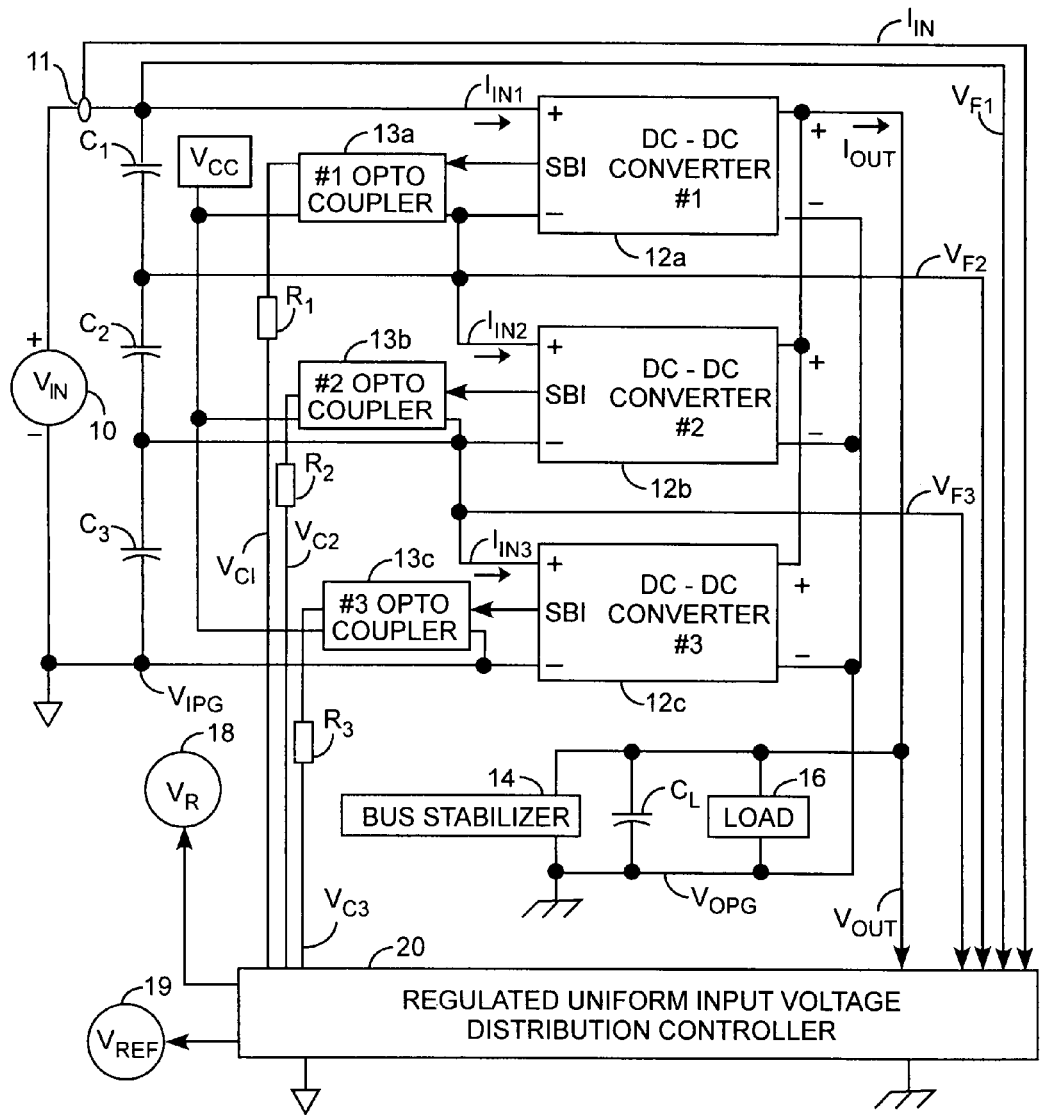
FIG. 1 is a block diagram of a uniform converter input voltage distribution power system.

An embodiment of the invention is described with reference to the figures using reference designations as shown in the figures. Referring to FIG. 1, a uniform converter input voltage distribution power system receives a $V_{IN}$ input voltage from an input voltage source 10 with respect to an input power ground $V_{IPG}$ for providing an output voltage $V_{OUT}$ with respect to an output power ground $V_{OPG}$. There is electrical isolation between the input and output power ground levels. An input current sensor 11 provides for an input-current sensed voltage $I_{IN}$. The $V_{IN}$ input voltage 10 is applied to a plurality of interconnected DC-DC converters such as a first DC-DC converter 12a, a second DC-DC converter 12b, and a third DC-DC converter 12c, all of which are connected in a series-input parallel-output configuration. The input voltage 10 is applied across input capacitors C1, C2, and C3 that are connected in series for providing floating voltages $V_{F1}$, $V_{F2}$, and $V_{F3}$, respectively. The output voltage $V_{OUT}$ and an output current $I_{OUT}$ are applied to a bus stabilizer 14 and a load 16 having a load capacitance $C_L$. The output voltage $V_{OUT}$ and output current $I_{OUT}$ are stabilized across the load 16 using a bus stabilizer 14 for providing a smoothed output voltage $V_{OUT}$.

The first floating voltage $V_{F1}$ is tied directly to $V_{IN}$ input voltage 10, and hence, the first floating voltage $V_{F1}$ equals the input voltage $V_{IN}$. The floating voltages $V_{F1}$, $V_{F2}$, and $V_{F3}$ are sensed with respect to the input power ground $V_{IPG}$ while limited by and between the input voltage $V_{IN}$ and input power ground $V_{IPG}$. Series connections among the converters at the power inputs require the input-output electrical isolation within all the connected converters. Because of the converter input-output electrical isolation, the floating voltages are isolated from the output power ground $V_{OPG}$. Therefore, the system maintains a predetermined distribution of power through the converters 12a, 12b, and 12c, by providing electrical isolation to the floating voltages with respect to the output power ground $V_{OPG}$. In the preferred form, the power distribution among the converters 12a, 12b, and 12c is equal so that the differential voltages being voltage differences extracted from pairs of consecutive floating voltages as $V_{F1}$ minus $V_{F2}$, $V_{F2}$ minus $V_{F3}$, and $V_{F3}$ minus the input power ground $V_{IPG}$, are equal, and hence, these differential voltages $V_{F1}$ minus $V_{F2}$, $V_{F2}$ minus $V_{F3}$, and $V_{F3}$ minus $V_{IPG}$, sum to $V_{IN}$. The electrical isolation within all the connected converters also provide an option to tie both the input and output power grounds, $V_{IPG}$ and $V_{OPG}$, together at a single-point ground node, which is preferred to be the same reference ground node for the non-isolated control signals produced by the input voltage distribution controller 20. Furthermore, the power system input-output electrical isolation can be preserved when the controller 20 is also designed to have an internal electrical isolation between the input and output power grounds, thereby, ensuring the system-level isolation between $V_{IPG}$ and $V_{OPG}$ nodes.

The converters 12a, 12b, and 12c have shared bus inputs SBI that are active pull down inputs respectively driven by a first optocoupler 13a, and second optocoupler 13b, and a third optocoupler 13c. Each DC-DC converter includes a shared-bus control input SBI that allows an external signal to take control of the converter. The external control voltage on the shared bus input SBI of each converter must be provided with respect to the input power return negative input terminal of the converter. The controller produces control signals $V_{C1}$, $V_{C2}$, through, $V_{CN}$ with respect to the input power ground $V_{IPG}$. A means of signal level-shifting is used, such as optocoupling for distributing the respective control voltages to the respective SBI. The number N is the number of series-connected converters. Because each optocoupler provides electrical isolation between input and output circuitry, signal level-shifting is achievable with a minimized risk of signal contamination by switching noises produced by the converters.

The optocouplers 13a, 13b, and 13c are powered by a bias voltage source $V_{CC}$ that is provided with respect to the same input power ground node $V_{IPG}$. The optocouplers 13a, 13b, and 13c are respectively controlled by the control voltages $V_{C1}$, $V_{C2}$, and $V_{C3}$ through respective input resistors $R_1$, $R_2$, and $R_3$. The floating voltages $V_{F1}$, $V_{F2}$, and $V_{F3}$ are respectively connected to positive inputs of the converters 12a, 12b, and 12c. The second floating voltage $V_{F2}$, the third floating voltage $V_{F3}$, and the input power ground $V_{IPG}$ are respectively connected to negative inputs of the converters 12a, 12b, and 12c. To accommodate a low-noise signal-level shifting, each of the optocoupler 13a, 13b, and 13c provide electrical isolation between its input circuit including the power ground $V_{IPG}$ and its output circuit including its respective shared-bus input SBI and the negative input of the respective converter. A regulated uniform input voltage distribution controller 20 receives the floating voltages $V_{F1}$, $V_{F2}$, and $V_{F3}$ with respect to the input ground $V_{IPG}$, receives the output voltage $V_{OUT}$ with respect to the output ground $V_{OPG}$, receives the input-current sensed voltage $I_{IN}$ with respect to the input power ground $V_{IPG}$, preferably provides a regulation voltage $V_R$, and preferably provides a reference voltage $V_{REF}$. The distribution controller 20 operates to distribute the output power $I_{OUT} \times V_{OUT}$ among the converters 12a, 12b, and 12c by providing respective control voltages $V_{C1}$, $V_{C2}$, and $V_{C3}$ with respect to the input power ground $V_{IPG}$.

Figure 2A:
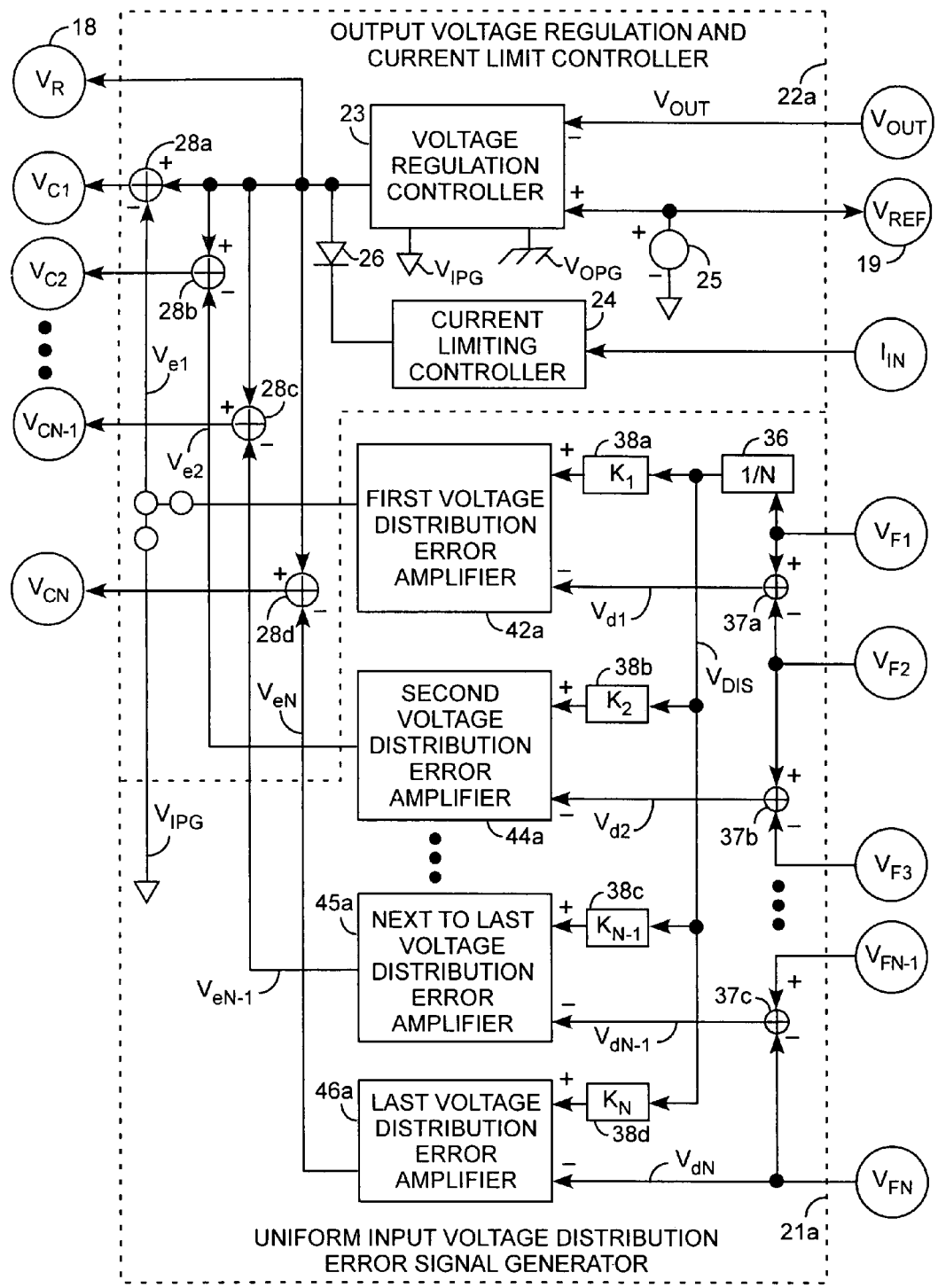
FIG. 2A is a block diagram of a uniform input voltage distribution controller.

Referring to FIGS. 1 and 2, and more particularly to FIG. 2A, a uniform input voltage distribution controller that may be a regulated uniform input voltage distribution controller 20, includes a uniform input voltage distribution error signal generator 21a and an output voltage regulation and current limiting controller 22a. The controller 22a includes a voltage regulation controller 23 providing the regulation voltage $V_R$, a current limiting controller 24, and a reference source 25 providing the $V_{REF}$ reference voltage 19. The current limiting controller 24 receives the input-current sensed voltage $I_{IN}$ and drives a current limit diode 26 that pulls down the $V_R$ regulation voltage 18 when the system is in an over current condition so as to reduce the output current $I_{OUT}$ usually occurring during a system failure or an output overload condition. The voltage regulation controller 23 receives the output voltage $V_{OUT}$ and reference voltage $V_{REF}$ and provides a regulated voltage $V_R$. Voltage regulation and current limiting controllers 23 and 24 are well known. The output voltage regulation and current limiting controller 22a includes a set of error subtractors 28a, 28b, 28c, through 28d for respectively providing the control voltages $V_{C1}$, $V_{C2}$, through $V_{CN-1}$ and $V_N$. The control voltages $V_{C1}$, $V_{C2}$, through $V_{CN-1}$ and $V_N$ equal the regulation voltage $V_R$ minus respective distribution error signals $V_{e1}$, $V_{e2}$, through $V_{eN-1}$, and $V_N$. When the system-level input-output electrical isolation is required, the voltage regulation controller 23 also needs to provide an isolation means to isolate electrically the output voltage $V_{OUT}$ and the output power ground node $V_{OPG}$ from the input power ground node $V_{IPG}$. Consequently, the controller 23 may employ either an electro-optic coupling circuit or an electro-magnetic coupling circuit to have the controller output signal with respect to the input power ground that is isolated from the output power ground. Depending on the circuit design detail within the controller 23, the reference voltage $V_{REF}$ may optionally have its negative node tied to the output power ground instead of the input power ground.

The uniform input voltage distribution error signal generator 21a receives the floating voltages $V_{F1}$, $V_{F2}$, $V_{F3}$, through $V_{FN-1}$, and $V_{FN}$ and the input power ground $V_{IPG}$ and provides the distribution error signals $V_{e1}$, $V_{e2}$, through $V_{eN-1}$, and $V_N$ respectively to the error subtractors 28a, 28b, through 28c, and 28d. The error signal generator 21a generates differential input signals $V_{d1}$, $V_{d2}$, through $V_{dN-1}$ and $V_{dN}$. Each differential input signal $V_d$ indicates a difference between two consecutive floating voltages, where $V_{d1}=V_{F1}-V_{F2}$, $V_{d2}=V_{F2}-V_{F3}$, $V_{dN-1}=V_{FN-1}-V_{FN}$, and $V_{dN}=V_{FN}-V_{IPG}$. The last distribution voltage $V_{dN}$ is simply equal to $V_{FN}$ effectively using an error subtractor, not shown, as the differential voltage $V_{dN}$ is merely equal to the last floating voltage $V_{FN}$ as the input power ground $V_{IPG}$ is relatively zero.

The error signal generator 21a sets the power distribution among the DC-DC converters, such as converters 12a, 12b, and 12c. The power distribution can be equal or scaled with respect to N DC-DC converters. For equal distribution, where the differential voltages all equal each other, a 1/N divider 36 is used to divide by N the floating voltage $V_{F1}$ that is equal to the input voltage $V_{IN}$. With equal distribution, the divider 36 provides a distribution voltage $V_{DIS}=V_{IN}/N$ that sets an equal differential voltage between the consecutive floating voltages $V_{F1}$ through $V_{IGP}$. For an alternative scaled power distribution, where the 1/N divider may or may not be set to unity providing no division of the first floating voltage $V_{F1}$ that is $V_{IN}$. Instead, the first floating voltage $V_{F1}$ is routed to N scalars including a $K_1$ scalar 38a, a $K_2$ scalar 38b, through a $K_{N-1}$ scalar 38c and a $K_N$ scalar 38d. The scalars 38a, 38b, 38c, and 38d provide respective scaled distribution voltages to a first voltage distribution error amplifier 42a, a second voltage distribution error amplifier 44a, a next to last voltage distribution error amplifier 45a, and a last voltage distribution error amplifier 46a. By setting scalars 38a through 38d to different scales, the differential voltages between the floating voltages can be unequal distribution in any proportion of the output voltage $V_{OUT}$ as desired, provided that $K_1+K_2$ through $+K_{N-1}+K_N=N$, where $K_i<N$ for i=1 to N.

Figure 2B:
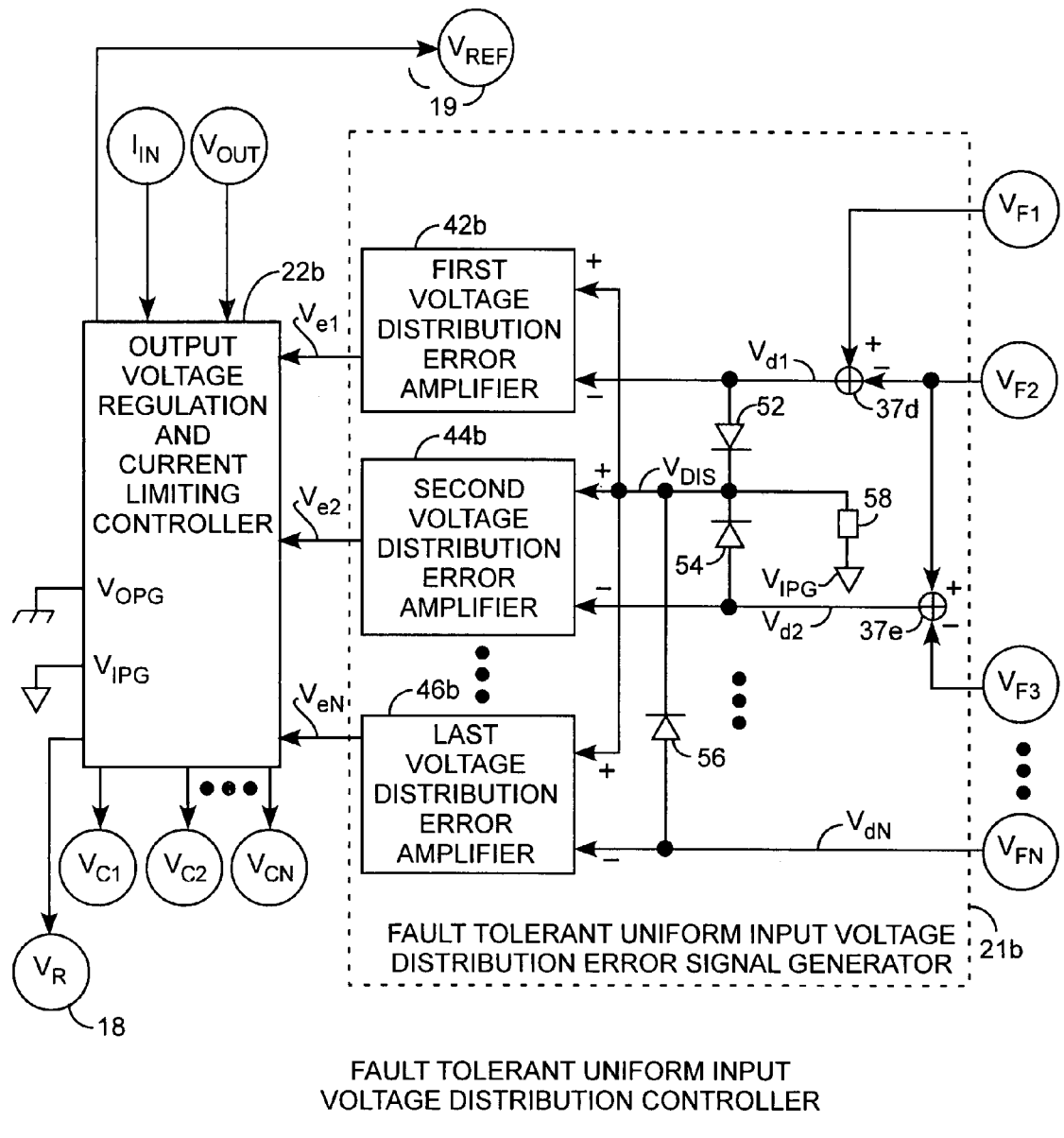
FIG. 2B is a block diagram of a fault tolerant uniform input voltage distribution controller.

The distribution controller 20 can be improved to allow for relaxed power distribution operation among the converters. One of the error voltages $V_e$, such as $V_{e1}$ for example, may be set to zero by connecting the error voltage to input power ground $V_{IPG}$. In the preferred form, the first error voltage $V_{e1}$ from the first error amplifier 42a is tied to the input power ground level such that the first error amplifier is not used. An error signal $V_e$ for just one relaxed converter can be tied to zero. As such, there continuously a zero level error for the error signal, such as the first error signal $V_{e1}$ for the first converter 12a that becomes the relaxed converter. The error voltages $V_e$ are respectively subtracted from the regulation voltage $V_R$ using the error subtractors 28a through 28d. When all of the error voltages $V_e$ are zero, then each of the control voltages $V_C$ equals the regulation voltage $V_R$. When all of the control voltages $V_C$ are settled to the equilibrium values, which can be equal or different from each other then all of the DC-DC converters are equally controlled to transfer the same power level. The $V_{e1}$ signal is set to be permanently inactive and zero in value while the first control voltage $V_{C1}$ for the relaxed converter 12a is held at $V_R$. Hence, there is only one relaxed converter having an inactive error voltage while the remaining converters are not relaxed or tightly controlled by the respective active error signals. When one of the unrelaxed converters fails, short-circuit with excessive input current as compared to those of other converters, the respective differential input voltage $V_d$ will significantly drop below the expected value $V_{IN}/N$, consequently causing the active error signal of the failed converter to become negatively large, providing a useless attempt to reduce the current flow into the failed converter which cannot be controlled any longer. As such, the lost power from the unrelaxed converter that already fails is transferred to the relaxed converters, causing the relaxed converter to transfer more power to maintain the normal system output regulation, naturally increasing the input voltage of the relaxed converter. As such, the power shortage initiated from one failed converter can be compensated by more power flow in the relaxed converter. Therefore, for more room of fault-tolerant capability after one or more failures of unrelaxed converters, the relaxed converter may have a maximum input voltage rating that is significantly higher than those of the unrelaxed converters. However, when a relaxed converter fails, the power system will lose the output regulation in the form of either output over-voltage when the relaxed converter fails by a short-circuit or output under-voltage when the relaxed converter fails by an open circuit. Referring to FIGS. 1, 2A, and 2B, and more particularly to FIG. 2B, a fault tolerant uniform input voltage distribution controller is used for converter fault tolerance in the event that one of the converters fails short-circuit or over-current drawing from the converter inputs. The fault tolerant uniform input voltage distribution controller includes an output voltage regulation and current limiting controller 22b and a fault tolerant uniform input voltage distribution error signal generator 21b. The error signal generator 21b receives the floating voltages $V_{F1}$ $V_{F2}$, $V_{F3}$ through $V_{FN}$, and $V_{IPG}$. As before, a last differential subtractor is not needed as $V_{IPG}$ is zero ground such that $V_{dN}=V_{FN}-V_{IPG}=V_{FN}$. The error signal generator 21b includes a set of differential subtractors including differential subtractors 37d and 37e for creating differential voltages $V_{d1}$, $V_{d2}$, through $V_{dN}$ for providing the error voltage $V_{e1}$, $V_{e2}$, through $V_{eN}$. A set of distribution ideal diodes 52, 54 through 56 and a distribution resistor 58 are used to create another exemplar form of the distribution voltage $V_{DIS}$ produced from an ideal-diode network arranged in a wire-ORed diode configuration. Each of the differential voltages $V_d$ drives a distribution ideal diode. When any one of the differential voltages $V_d$ increases and exceeds $V_{DIS}$, indicating that one converter experiences an increase of its input voltage, $V_{DIS}$ is then increased to reflect the highest converter input voltage, which then increases the error voltages $V_e$, of the remaining converters that have lower input voltages. Those increased error voltages $V_e$ then decrease the control voltages $V_C$ as a result of distributed subtractions within controller 22b. The decreased control voltages $V_C$ then drives the respective remaining converters of lower input voltages to reduce the input power flows, which in turn cause the input voltages of the remaining converter to increase toward $V_{DIS}$. At the same time, the converter of the highest input voltage naturally updates its input voltage to be converged to 1/N of the system input voltage. On the other hand, when there is an overdrawn input current by a fail-short or overloading converter that then decreases its respective differential voltage or the input voltage. This uncontrollable reduction of the input voltage of the overloading converter will naturally increase the input voltages of the remaining controllable converters, subsequently, causing the commanding distribution voltage $V_{DIS}$ to increase to a higher value as a compensation for the input voltage loss of the overloading and uncontrollable converter. By way of example, when the first converter 12a becomes uncontrollable and its input voltage decreases significantly while two other converters 12b and 12c remain functional. When the second converter 12b remains controllable by $V_{C2}=V_R-V_{e2}=V_R-A(V_{DIS}-V_{d2})=V_R-A(V_{DIS}-V_{F2}+V_{F3})$ where A is the low frequency gain of the distribution error amplifiers. The distribution voltage $V_{DIS}$ may naturally be updated to a higher value reflecting the highest input voltage of the third converter 12c and thus $V_{DIS}-V_{d3}=0$. As a result, $V_{d2}$ becomes less than $V_{DIS}$, subsequently, causing $V_{C2}$ to be less than $V_{C3}$. The lower $V_{C2}$ below $V_R$ leads to a decrease of the input power flow into the second converter 12b. This decrease of input power flow into the second converter 12b allows the input voltage of the second converter 12b to increase toward the updated distribution voltage $V_{DIS}$ for increasing $V_{d2}$ in controlled feedback and at the same time naturally causing $V_{d3}$ and $V_{DIS}$ to be updated to approach an equilibrium distribution voltage. Eventually, the differential voltages $V_{d2}$ and $V_{d3}$ converge to each other to compensate for the voltage loss produced by the uncontrollable overloading first converter 12a.

The wire-ORed ideal-diode arrangement provides for fault tolerance. The distribution voltage $V_{DIS}$ equals the largest of differential voltage $V_d$. In the event that one of the converters fails, such as the second converter 12b, and a respective differential voltage, such as $V_{d2}=V_{F2}-V_{F3}$ largely decreases, another differential voltage, such as $V_{d1}=V_{F1}-V_{F2}$, largely increases. The increasing differential voltage, such as $V_{d1}$, drives the distribution voltage $V_{DIS}$ much higher. As the distribution voltage $V_{DIS}$ increases, the remaining working converters will be driven harder to provide more of an input voltage to make up for the input voltage loss of the failed converter. In this manner, when any one of the converters fails, the remaining working converters provide increased input voltages so as to provide converter fault tolerance. Each of those ideal diodes can be implemented by using a circuit consisting of an operational amplifier, a non-ideal diode, and a resistor. Furthermore, there is no need to include all N ideal-diodes into the wire-ORed diode arrangement. At least two ideal diodes are sufficient for the wire-ORed diode arrangement. Only two ideal diodes can also be used to derive the commanding distribution voltage from two respective differential input voltages produced by the two respective converters. The system controller 20 is still able to provide a reliable commanding distribution voltage $V_{DIS}$ with fault-tolerance.

Figure 3:
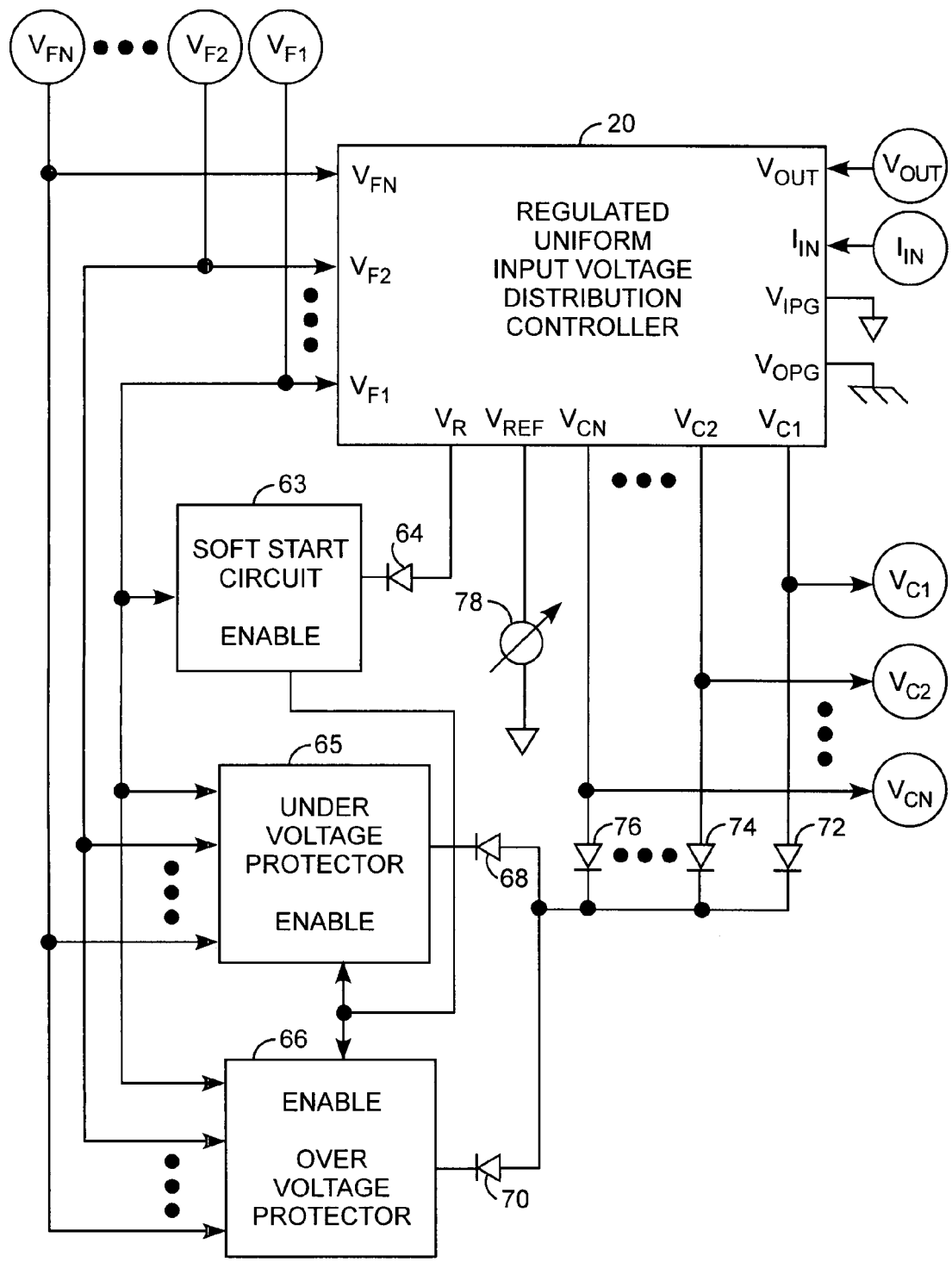
FIG. 3 is a block diagram of an adjustable uniform input voltage distribution controller.

Referring to all of the figures, and more particularly to FIG. 3, an adjustable uniform input voltage distribution controller can be implemented using the regulated uniform input voltage controller 20 to provide over voltage protection, under voltage protection, and soft starting. These functions are well known in the art. A soft start circuit 63 is connected to the regulation voltage $V_R$ through a soft start diode 64. When either the regulation voltage $V_R$ has reached a predetermined operational level or the predetermined start-up time has elapsed, the soft start circuit provides an enable signal communicated to an under voltage protector 65 and an over voltage protector 66 respectively connected to an under voltage diode 68 and an over voltage diode 70. The diodes 68 and 70 are pull down diodes that are in turn connected together and to a set of control diodes 72, 74, through 76 respectively connected to the control voltages $V_{C1}$, $V_{C2}$, through $V_{CN}$. After the protectors 65 and 66 are enabled, the protectors 65 and 66 monitor the floating voltages $V_F$. When any one of the floating voltages is above a predetermined value, indicating an over voltage condition, the over voltage protector pulls down the over voltage diode that in turn pulls down the control voltages $V_C$ for shutting down power operation of the converters. Therefore, whenever there is an open-circuit failure created by a converter, the system is shut-down through the over-voltage protector. A latched over-voltage protection may be preferred to sustain the power system shut-down operation once a prolonged over-voltage occurred across any converter input. When any one of the floating voltages is below a predetermined value, indicating an under voltage condition, the under voltage protector pulls down the over voltage diode that in turn pull down the control voltages $V_C$ for shutting down power operation of the converters. Consequently, the system shuts down whenever there is a prolonged short-circuit failure created by a converter.

The present invention is directed to a series-input parallel output uniform voltage distribution power system for providing an output voltage $V_{OUT}$ from an input voltage $V_{IN}$, using DC-DC converters controlled through respective input isolators which can be either electro-optic or electromagnetic devices driving the converters where the isolators are controlled by error voltages $V_e$ generated from a common distribution voltage $V_{DIS}$ and from differential voltages $V_d$ that are voltage differences between consecutive floating voltages $V_F$ that sum to equal the input voltage $V_{IN}$. In the preferred form, optocouplers are used to provide a low-noise signal-level shifting of the control voltages $V_C$ that are referenced with respect to the input power ground $V_{IPG}$ into the respective converter shared-bus signals that must be referenced with respect to the negative inputs of the respective converters. Those negative inputs of the series-input converters have variable floating voltages $V_F$ relative to the input power ground $V_{IPG}$. The generation of the distribution voltage $V_{DIS}$ can be generated by a divider for equal power distribution among the converters, can be used by scalars for unequal power distribution, or can be generated by a wired-OR ideal diode arrangement to provide fault tolerance of anyone of the converters. In a preferred form, the system can be relaxed by having a relaxed converter set to provide only normal output regulation while the remaining unrelaxed converters are set to provide the input voltage distribution, so that, when one of the unrelaxed converters fails, the relaxed converter provides increase power to compensate for power that is lost from the failing unrelaxed converter.

The power system has potential applications to expandable telecommunication power systems, expandable computer power systems, modular satellite power systems, input stacked conventional converters for lower output voltage, terrestrial energy renewable power systems, expandable power supplies for medical equipment, recycled energy electronic load for efficient burn-in testing, battery testing and maintenance equipment for uniform voltage equalization among series connected battery cells, and solar array voltage equalizer among series connected solar array panels that have nearly the same peak power voltage but different peak power ratings.

The system is preferably implemented using a uniform distribution controller that includes an output voltage controller for providing the primary control voltage $V_R$ and an error signal generator for providing error voltages $V_e$ as a secondary control voltages. The output voltage controller receives the error voltages $V_e$ to provide distributed control voltages $V_C$ to the signal-level shifting isolators for isolated control of the converters. The error signal generator generates the error voltages $V_e$ from a commanding distribution signal $V_{DIS}$ and differential voltages $V_d$ derived from differences between consecutive floating voltages $V_F$. The commanding distribution signal $V_{DIS}$ is derived either from the system input voltage $V_{IN}=V_{F1}$ or from at least two of the differential voltages $V_d$. Those skilled in the art can make enhancements, improvements, and modifications to the invention, and these enhancements, improvements, and modifications may nonetheless fall within the spirit and scope of the following claims.

What is claimed is:

1. A power system for providing an output voltage having an output power ground from an input voltage having an input power ground, the power system comprising,
    converters receiving a series of floating voltages, the floating voltages extending in voltage potential sequence between the input voltage and an input power ground, the floating voltages floating with respect to the output power ground, each of the converters receiving two consecutive ones of the floating voltages, the converters having converter outputs connected in parallel for providing the output voltage, the converters controlled by control voltages for controlling conversion between the two consecutive ones of the floating voltages and a respective one of the converter outputs,
    input isolators for respectively receiving the control voltages and controlling the conversion of the converters between the floating voltages and the converter outputs,
    a distribution controller for receiving the floating voltages and generating the control voltages from the floating voltages and a distribution voltage, the distribution voltage generated from the input voltage for power distribution among the converters, and
    wherein the distribution controller comprises, an error generator for receiving the floating voltages and generating error voltages from the distribution voltage and the floating voltages, and a regulation controller for receiving the error voltages and generating the control voltages from the error voltages and a regulation voltage.

2. The power system of claim 1 wherein the distribution controller comprises,
    an error generator for receiving the floating voltages and generating error voltages from the distribution voltage and the floating voltages, the error generator comprising differential subtractors for providing differential voltages between two consecutive ones of the floating voltages, the error generator comprising amplifiers for generating the error voltages from the differential voltages and the distribution voltage,
    a regulation controller for receiving the error voltages and generating the control voltages from the error voltages and the regulation voltage, the regulation controller comprising error subtractors for subtracting the error voltages from the regulation voltage for generating the control voltages.

3. The power system of claim 1 wherein the distribution controller comprises,
    an error generator for receiving the floating voltages and generating error voltages from the distribution voltage and the floating voltages, the error generator comprising differential subtractors for providing differential voltages between two consecutive ones of the floating voltages, the error generator comprising amplifiers for generating the error voltages from the differential voltages and the distribution voltage, the distribution voltage is 1/N the input voltage for providing equal power distribution among the converters, the differential voltages being equal to each other, and
    a regulation controller for receiving the error voltages and generating the control voltages from the error voltages and the regulation voltage, the regulation controller comprising error subtractors for subtracting the error voltages from the regulation voltage for generating the control voltages.

4. The power system of claim 1 wherein the distribution controller comprises,
    an error generator for receiving the floating voltages and generating error voltages from the distribution voltage and the floating voltages, the error generator comprising differential subtractors for providing differential voltages between two consecutive ones of the floating voltages, the error generator comprising amplifiers for generating the error voltages from the differential voltages and the distribution voltage, the distribution voltage is the input voltage, the error generator comprising scalars for scaling the distribution voltage to each of the error generators for providing unequal power distribution among the converters, the differential voltages being unequal to each other, and
    a regulation controller for receiving the error voltages and generating the control voltages from the error voltages and from the regulation voltage, the regulation controller comprising error subtractors for subtracting the error voltages from the regulation voltage for generating the control voltages.

5. The power system of claim 1 wherein the distribution controller comprises,
    an error generator for receiving the floating voltages and generating error voltages from the distribution voltage and the floating voltages, the error generator comprising differential subtractors for providing differential voltages between two consecutive ones of the floating voltages, the error generator comprising amplifiers for generating the error voltages from the differential voltages and the distribution voltage, the distribution voltage is a maximum voltage among the differential voltages, the error generator comprising a distribution arrangement for receiving the differential voltages and providing the distribution voltage, to each of the amplifiers for providing fault tolerant and equal power distribution among the converters, the differential voltages being equal to each other, and a regulation controller for receiving the error voltages and generating the control voltages from the error voltages and from the regulation voltage, the regulation controller comprising error subtractors for subtracting the error voltages from the regulation voltage for generating the control voltages.

6. The power system of claim 1 wherein,
the input isolators are optocouplers.

7. The power system of claim 1 further comprising,
capacitors connected in series between the input voltage and the input power ground, the capacitors respectively filtering the floating voltages.

8. A power system for providing an output voltage having an output power ground from an input voltage having an input power ground, the power system comprising,
converters receiving a series of floating voltages, the floating voltages extending in voltage potential sequence between the input voltage and an input power ground, the floating voltages floating with respect to the output power ground, each of the converters receiving two consecutive ones of the floating voltages, the converters having converter outputs connected in parallel for providing the output voltage, the converters controlled by control voltages for controlling conversion between the two consecutive ones of the floating voltages and a respective one of the converter outputs,
optocouplers for respectively receiving the control voltages and controlling the conversion between the floating voltages and the converter outputs, and
a distribution controller for receiving the floating voltages and generating the control voltages from the floating voltages and from a distribution voltage, the distribution voltage generated from the input voltage for power distribution among the converters, the distribution controller comprising an error generator and a regulation controller, the error generator receiving the floating voltages and generating error voltages from the distribution voltage and from the floating voltages, the regulation controller receiving the error voltages and generating the control voltages from the error voltages and a regulation voltage.

9. A power system for providing a system output voltage having an output power ground from a system input voltage having an input power ground, the power system comprising,
converters having converter output voltages connected by parallel-output connections for providing the system output voltage, the converters having converter input voltages connected by series-input connections as a series of successive respective converters input voltages extending between the system input voltage and the input power ground, the converters respectively receiving successive pairs of the converter input voltages at positive input terminals and negative input terminals of the converters, the converter input voltages summing together to the system input voltage by the series-input connections, the converters having respective control ports for controlling the successive conversions of the respective successive pairs of the converter input voltages to the system output voltage, the converter input voltages floating in reference to the system power ground, the converter input voltages referencing the input power ground,
voltage-divider capacitors connected in series between the system input voltage and the input power ground for partitioning the system input voltage into the respective series of successive converter input voltages between the system input voltage and the input power ground, the voltage-divider capacitors form a series connection of capacitors for providing voltage filtering and energy storage across the converters input voltages,
input isolators for respectively receiving control voltages referenced to the input power ground, the input isolators providing signal-level shifting of the control voltages into respective shared-bus voltages respectively driving the control ports of the converters, the shared-bus voltages controlling DC-DC voltage conversion between the successive pairs of converter input voltages and the converter output voltages, the shared-bus voltages appearing between the control ports and the negative input terminals of the converters, and
a distribution controller for receiving the converter input voltages for generating a distribution voltage and the converter control voltages for maintaining the system output voltage at a predetermined regulation voltage, each of the converters contributing to the system output voltage, the distribution controller generating differential voltages from the converter input voltages, each of the differential voltages equaling to a voltage difference between two consecutive ones of the converter input voltages, the distribution controller generating error voltages from the differential voltages and from the distribution voltage, the distribution controller generating the control voltages from the error voltages and the regulation voltage.

10. The power system of claim 9 wherein the distribution controller comprises,
an error generator for generating the error voltages, the generator comprising differential subtractors for receiving the respective pairs of the successive respective input voltages and providing the differential voltages, the error generator comprising amplifiers for receiving the differential voltages and the distribution voltage for generating the error voltages, and
a regulation controller for receiving the error voltages and generating the converter control signals from the error voltages and from the regulation voltage, the regulation controller comprising error subtractors for subtracting the error voltages from the regulation voltage for generating the converter control signals.

11. The power system of claim 9 wherein,
the input isolators are optocouplers, and
each of the converters provides electrical isolation between the converter inputs and converter outputs.

12. The power system of claim 9 wherein the converters are N converters, the converter control signals are N converter control signals, the error voltages are N error voltages, and the differential voltages are N differential voltages, the distribution controller comprises,
an error generator for receiving the N converter input voltages and generating the N error voltages from the distribution voltage and the N converter input voltages, the error generator comprising differential subtractors for providing the N differential voltages between two consecutive ones of the N converter input voltages, the error generator comprising amplifiers for generating the error voltages from the N differential voltages and the distribution voltage, the error generator comprising a 1/N divider, the distribution voltage is equal to the system input voltage divided by N for providing equal power distribution among the N converters, and
a regulation controller for receiving the N error voltages and generating the N converter control voltages from the N error voltages and from the regulation voltage, the regulation controller comprising N error subtractors for subtracting the error voltages from the regulation voltage for generating the N converter control voltages.

13. The power system of claim 9 wherein the converters are N converters, the converter control signals are N converter control signals, the error voltages are N error voltages, and the differential voltages are N differential voltages, the distribution controller comprises, an error generator for receiving the N converter input voltages and generating the N error voltages from the distribution voltage and the N converter input voltages, the error generator comprising N differential subtractors for providing the N differential voltages between two consecutive ones of the N converter input voltages, the error generator comprising N amplifiers for generating the error voltages from the N differential voltages and the distribution voltage, the error generator comprising N scalars for scaling the distribution voltage for each of the amplifiers for providing the N error voltages for providing unequal power distribution among the N converters, the differential voltages being unequal to each other, and a regulation controller for receiving the N error voltages and generating the N converter control signals from the N error voltages and from the regulation voltage, the regulation controller comprising N error subtractors for subtracting the N error voltages from the regulation voltage for generating the N converter control signals.

14. The power system of claim 9 wherein the converters are N converters, the converter control signals are N converter control signals, the error voltages are N error voltages, and the differential voltages are N differential voltages, the distribution controller comprises, an error generator for receiving the N converter input voltages and generating the N error voltages from the distribution voltage and the N converter input voltages, the error generator comprising N differential subtractors for providing the N differential voltages between two consecutive ones of the N converter input voltages, the error generator comprising N amplifiers for generating the error voltages from the N differential voltages and the distribution voltage, the distribution voltage is equal to a maximum one of the differential voltages, the error generator comprising a maximum-signal distribution arrangement for receiving the differential voltages and providing the distribution voltage, to each of the N amplifiers for providing fault tolerance of any failed one of the N converters with equal power distribution among remaining operating ones of the N converters with N−1 differential voltages being equal to each other, and a regulation controller for receiving the N error voltages and generating the N converter control voltages from the N error voltages and from the regulation voltage, the regulation controller comprising N error subtractors for subtracting the N error voltages from the regulation voltage for generating the N converter control voltages.

15. The power system of claim 9 wherein the converters are N converters, the converter control signals are N converter control signals, the error voltages are N error voltages, and the differential voltages are N differential voltages, the distribution controller comprises, an error generator for receiving the N converter input voltages and generating the N error voltages from the distribution voltage and the N converter input voltages, one of the N error voltages is ground as a grounded error signal for the first converter of the N converters for providing N−1 error voltages for the remaining N−1 converters, the error generator comprising N−1 differential subtractors for providing the N−1 differential voltages between two consecutive ones of the N−1 converter input voltages, the error generator comprising N−1 amplifiers for generating the N−1 error voltages from the N−1 differential voltages and the distribution voltage, for providing relaxed power distribution when anyone of the remaining N−1 converters fail with power distributed among the first converter and remaining ones of the N−1 converters with the first converter providing power instead of the failed one of the N−1 converters, and a regulation controller for receiving the N−1 error voltages and the ground error voltage for generating the N converter control voltages from the N error voltages and from the regulation voltage, the regulation controller comprising N error subtractors for subtracting the N error voltages from the regulation voltage for generating the N converter control voltages.

16. The power system of claim 9 wherein the distribution controller comprises a voltage regulator for regulating the system output voltage, the voltage regulator receiving the system output voltage and a reference voltage.

17. The power system of claim 9 wherein, the distribution controller comprises a current limiter receiving the system output voltage and an input current voltage indicating system input current from the system input voltage, the current limiter sensing input current and reducing the regulation voltage when the input current is at a predetermined current.

* * * * *